US006963459B2

(12) United States Patent
Sakai

(10) Patent No.: US 6,963,459 B2
(45) Date of Patent: Nov. 8, 2005

(54) METHOD AND APPARATUS FOR OPTIMIZING AUTO GAIN CONTROL OF READ CHANNEL IN A DISK DRIVE

(75) Inventor: Yuji Sakai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 10/190,701

(22) Filed: Jul. 9, 2002

(65) Prior Publication Data

US 2003/0021053 A1 Jan. 30, 2003

(30) Foreign Application Priority Data

Jul. 30, 2001 (JP) ............................ 2001-230202

(51) Int. Cl.[7] ................................................ G11B 5/09

(52) U.S. Cl. ........................... 360/46; 360/67; 360/68; 360/55

(58) Field of Search ........................ 360/46, 67, 68–69, 360/40, 55, 75, 48, 50–51, 27, 78.14, 53, 360/31, 39, 65

(56) References Cited

U.S. PATENT DOCUMENTS

| | | | | |
|---|---|---|---|---|
| 4,772,964 | A * | 9/1988 | Kaida | 360/67 |
| 5,373,403 | A * | 12/1994 | Okamura et al. | 360/67 |
| 5,592,347 | A * | 1/1997 | Mori et al. | 360/48 |
| 5,754,357 | A | 5/1998 | Anderson et al. | |
| 6,078,453 | A | 6/2000 | Dziallo et al. | |
| 6,337,777 | B1 * | 1/2002 | Matsubara et al. | 360/67 |

FOREIGN PATENT DOCUMENTS

| | | |
|---|---|---|
| EP | 0 229 925 A2 | 7/1987 |
| GB | 2 321 760 | 8/1998 |
| JP | 5-62202 | 3/1993 |
| JP | 6-187643 | 7/1994 |
| JP | 6-187733 | 7/1994 |
| JP | 8-161830 | 6/1996 |
| JP | 8-316754 | 11/1996 |
| JP | 9-63198 | 3/1997 |
| JP | 9-180373 | 7/1997 |
| JP | 9-288826 | 11/1997 |
| JP | 10-144002 | 5/1998 |
| JP | 10-177768 | 6/1998 |
| JP | 10-326403 | 12/1998 |
| JP | 11-154336 | 6/1999 |

OTHER PUBLICATIONS

Japanese Office Action, dated May 25, 2004 for Patent Application No. 2001-230202.

* cited by examiner

*Primary Examiner*—David Hudspeth
*Assistant Examiner*—Natalia Figueroa
(74) *Attorney, Agent, or Firm*—Pillsbury Winthrop Shaw Pittman, LLP

(57) ABSTRACT

There is disclosed a disk drive which can appropriately execute a gain control of an AGC amplifier included in a read channel for each zone on a disk. A CPU refers to table information stored in a memory, and reads initial gain data corresponding to the zone during switching of the zone as a read object. The CPU sets the read initial gain data into the AGC amplifier.

9 Claims, 6 Drawing Sheets

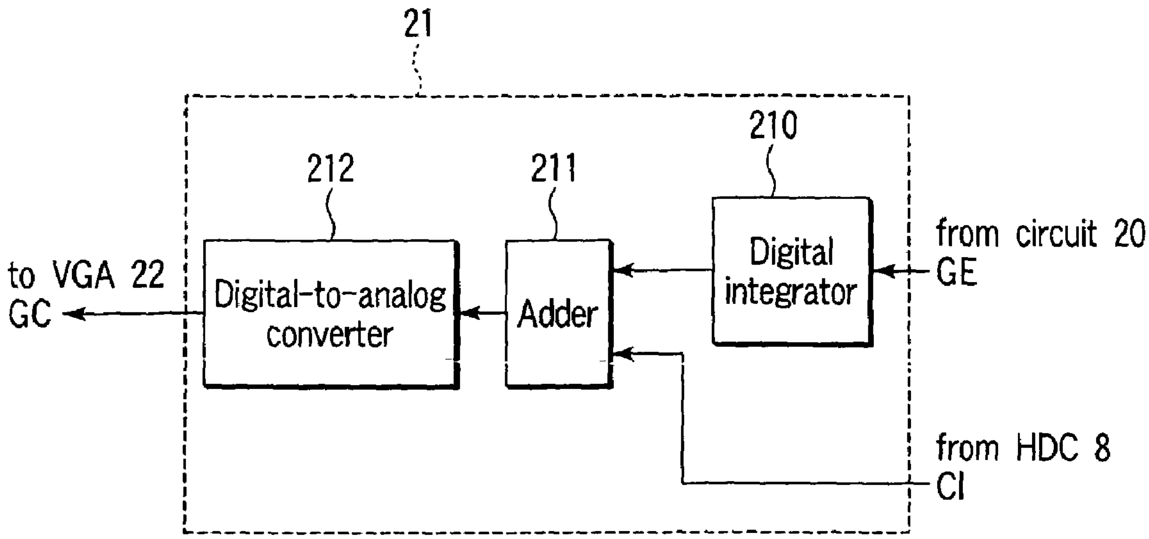
F I G. 2
AGC table 30
| | |
|---|---|
| Servo | CI-S |
| Zone0 | CI-0 |
| Zone1 | CI-1 |
| Zone2 | CI-2 |
| ⋮ | ⋮ |
F I G. 3

METHOD AND APPARATUS FOR OPTIMIZING AUTO GAIN CONTROL OF READ CHANNEL IN A DISK DRIVE

CROSS-REFERENCE TO RELATED APPLICATIONS

This application is based upon and claims the benefit of priority from the prior Japanese Patent Application No. 2001-230202, filed Jul. 30, 2001, the entire contents of which are incorporated herein by reference.

BACKGROUND OF THE INVENTION

1. Field of the Invention

The present invention relates generally to disk drives such as a hard disk drive, particularly to a gain control of an AGC amplifier included in a read channel.

2. Description of the Related Art

In recent years, in the field of disk drives represented by hard disk drives, development of a longitudinal magnetic recording method and a perpendicular magnetic recording method in which a recording density can be raised has been promoted.

In the disk drive of the perpendicular magnetic recording method, a read signal read from a disk medium (hereinafter referred to simply as the disk) by a read head forms a rectangular signal waveform whose amplitude corresponds to the direction of magnetization. When the read signal waveform is differentiated by a differentiation circuit, the read signal (i.e., the differentiated waveform) is obtained similarly as the longitudinal magnetic recording method.

Therefore, in the disk drive of the perpendicular magnetic recording method, when the differentiation circuit is disposed in a read channel as a signal processing circuit, a data decoder for decoding user data employed in the longitudinal magnetic recording method, or a servo decoder for decoding servo data can be used. Additionally, an actual signal processing circuit is realized as a read/write channel including the read channel and write channel for recording/processing the data and as a single chip LSI circuit.

Additionally, in the disk drive, the disk is always rotated at a constant speed by a spindle motor. Therefore, tracks on the disk have different linear speeds (relative speed of the disk and head) in accordance with positions in a radial direction. Therefore, when the data is recorded with a signal having the same frequency, a linear recording density (bit number of the user data recorded per constant length of a track longitudinal direction) differs with the track on an outer peripheral side and track on an inner peripheral side on the disk. That is, the linear recording density of the track on the outer peripheral side on the disk is reduced.

In order to secure a data storage capacity as large as possible in the disk drive, a recording method called a constant density recording (CDR) method is used in which the linear recording density becomes constant in each track without depending on the position in the radial direction of the disk. Additionally, the linear recording density is set to be constant by each track unit in an ideal CDR method, but a zone bit recording (ZBR) method is actually and practically used.

In the ZBR method, a group of tracks on the disk is formed by a unit called a zone, and a recording frequency of the data (similarly as a reproduction frequency) is set to be the same in the respective tracks included in one zone. In fact, a large number of track groups on one surface of the disk are formed and managed by about 10 to 20 zones.

In the ZBR method, the recording frequency of the data increases in the tracks included in the zone on the outer peripheral side on the disk, but the linear recording density substantially becomes constant as a whole. On the other hand, the recording frequency of each track is constant within the zone, but the recording frequency differs in the different zones. The data is recorded with a high recording frequency in the tracks included in the zone on the outer peripheral side. In a concrete example, in a disk drive having a disk diameter, for example, of 2.5 inches, the linear speed in the outermost peripheral track on the disk is substantially twice the linear speed of the innermost peripheral track. Therefore, in order to keep the linear recording density constant, it is necessary to record the data in the outermost peripheral track at a recording frequency twice that of the innermost peripheral track. That is, if there is a difference of n times in the linear speed between the outer and inner peripheral tracks, the data is then recorded at a recording frequency which is n times the recording frequency, and thereby the linear recording density is held constant.

On the other hand, a transition width of isolated magnetization formed on the disk does not depend on the linear speed, and is formed in a constant length (distance) with respect to a certain combination of the head and disk. Therefore, a transition time width of isolated magnetization is reduced in the tracks included in the outer peripheral zone whose linear speed is high in proportion to the position in the radial direction on the disk.

In general, a magnetoresistive (MR) element or a giant MR (GMR) element is used as a read head in the disk drive. The amplitude of the read signal read by the read head is substantially constant without depending on the position (linear speed) of the track in the radial direction. The read signal corresponds to the data recorded on the disk with the same linear recording density.

Therefore, particularly in the disk drive of the longitudinal magnetic recording method, an average value of the amplitudes of the read signals is substantially the same even from any inner/outer peripheral track. Therefore, an auto gain control (AGC) amplifier for use in the read/write channel (including the signal processing circuit of the read signal) of the disk drive may have only one gain value (hereinafter referred to as the initial gain value) set at an initial time. Additionally, since there is a dispersion in characteristics of the head or the disk, the initial gain value optimized for each disk drive is set. Moreover, the AGC amplifier is an amplifier for controlling the read signal read by the read head so that the amplitude of the signal becomes constant.

On the other hand, in the disk drive of the perpendicular magnetic recording method in which the CDR method or the ZBR method is employed, as described above, the differentiation circuit is disposed in the read/write channel. The differentiation circuit is a circuit for differentiating the read signal in the read channel to reproduce the data from the read signal. The differentiated signal has a signal amplitude which changes in proportion to the position (i.e., the linear speed) in the radial direction of the track. That is, the amplitude value of the read signal (differentiated signal) changes in proportion to the recording frequency for each track or each zone during a read operation. Therefore, there is the following problem.

That is, during the read operation, an AGC acquisition time in the initial operation of the AGC amplifier lengthens. As a result, a read error is easily generated in a data decode processing. When the read head is positioned in the track as an access object, the AGC amplifier included in the read/ write channel executes an AGC acquisition processing in the read operation from a first data sector of the track.

That is, the gain control of the AGC amplifier is executed until the amplitude of the read signal from the first data sector reaches a predetermined amplitude value. In the gain control, the initial gain value set for each disk drive is used. For example, when the initial gain value is set to be optimum in the track of an intermediate periphery on the disk, the amplitude of the read signal of the outermost/innermost peripheral track is different from that of the intermediate peripheral track, and therefore the AGC acquisition time lengthens. Therefore, since the read signal having the amplitude thereof insufficiently controlled is subjected to the data decode processing, a read error is easily generated.

BRIEF SUMMARY OF THE INVENTION

An object of the present invention is to provide a disk drive in which an automatic gain control of an AGC amplifier necessary in a read channel can be optimized for each track or each zone on a disk.

In accordance with one aspect of the present invention, there is provided a disk drive including facilities for optimizing a gain of an AGC amplifier in a read channel.

The disk drive comprises a disk medium in which a plurality of data areas with data recorded therein are constituted in a radial direction; a read head which executes a read operation of the data with respect to the respective data areas; an AGC amplifier which controls an amplitude of a read signal read by the head; a memory in which a plurality of gain value data set as gain values for setting a gain of the AGC amplifier for the respective data areas are stored so as to be adapted for recording frequency characteristics of the respective data areas; and a controller which reads the gain value data corresponding to the data areas as read objects from the memory, and sets the data into the AGC amplifier during the read operation by the read head.

BRIEF DESCRIPTION OF THE SEVERAL VIEWS OF THE DRAWING

FIG. 2 is a block diagram showing a main part of an AGC amplifier circuit according to the present embodiment;

FIG. 3 is a diagram showing one example of AGC table information according to the present embodiment;

DETAILED DESCRIPTION OF THE INVENTION

An embodiment of the present invention will be described hereinafter with reference to the drawings.

(Constitution of Disk Drive)

Figure 1:
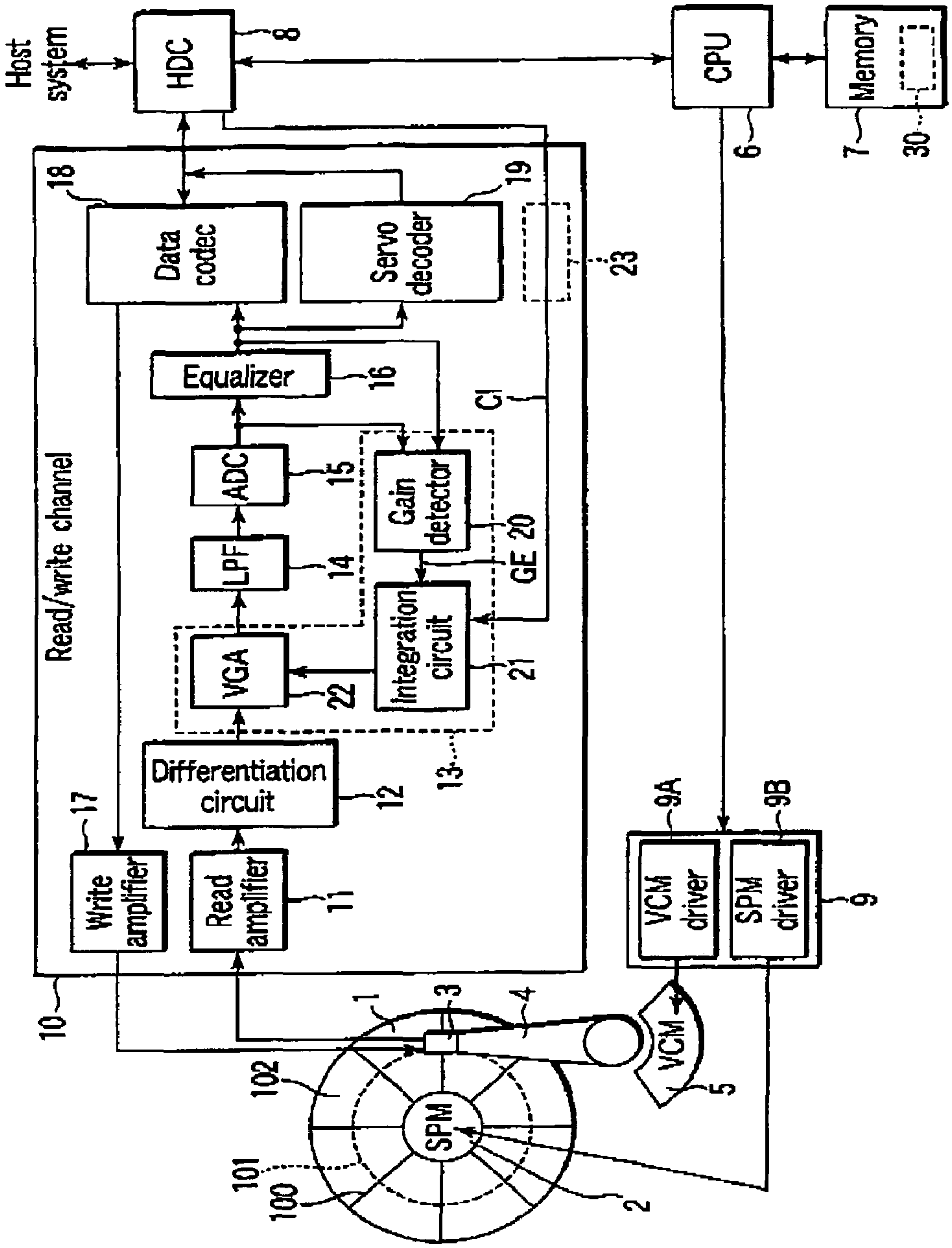
FIG. 1 is a block diagram showing a main part of a disk drive according to an embodiment of the present invention.

FIG. 1 is a block diagram showing a main part of a disk drive of a perpendicular magnetic recording method according to the present embodiment.

As shown in FIG. 1, the disk drive of the present embodiment comprises: a drive mechanism including a disk 1 for perpendicular magnetic recording, a spindle motor (SPM) 2 for rotating the disk 1, and an actuator on which a head 3 is mounted and which moves the head in a radial direction on the disk 1; and a control/signal processing circuit system.

The actuator includes an arm (including a suspension) 4 on which the head 3 is mounted, and a voice coil motor (VCM) 5 for generating a driving force. The actuator positions the head 3 in a target position (target track) on the disk 1 by servo control in a microprocessor (CPU) 6.

The head 3 has a structure in which a read head having an MR element or a GMR element, and a write head (inductive head) capable of executing the perpendicular magnetic recording are mounted on the same slider separately from each other.

The control/signal processing circuit system includes a read/write (R/W) channel 10, disk controller (HDC) 8, CPU 6, memory 7, and motor driver 9 for supplying driving currents to the VCM 5 and SPM 2.

The read/write channel 10 includes a read amplifier 11 for amplifying the read signal read by the head 3, differentiation circuit 12, AGC amplifier 13, low pass filter (LPF) 14, A/D (analog-to-digital) converter 15, digital equalizer 16, write amplifier 17, data codec 18, servo decoder 19, and register 23. Additionally, the read amplifier 11 and write amplifier 17 are usually constituted as a preamplifier IC separate from an LSI circuit constituting the read/write channel 10.

The differentiation circuit 12 differentiates the read signal amplified by the read amplifier 11, and outputs the signal to the AGC amplifier 13. The differentiation circuit 12 may be a high pass filter (HPF) which has a differentiation characteristic in a frequency band with signal components of the read signal present therein, and which has the same cut-off frequency characteristic as that of the frequency band. The AGC amplifier 13 is a circuit for adjusting a signal amplitude of the read signal (differentiated signal) to be a predetermined amplitude (described later). The LPF 14 is a filter for removing a noise having a required or more transmission band. The A/D converter 15 converts the analog read signal output from the LPF 14 to a digital signal.

The equalizer 16 is constituted of a digital filter or the like of a finite impulse response (FIR) method, and equalizes a read signal waveform (digital signal waveform) into a predetermined signal waveform. The write amplifier 17 converts write data modulated (converted to a recording code) by the data codec 18 to a recording current, and transmits the current to the write head. The data codec 18 is constituted of a data decoder for decoding the data from the read signal, and a data encoder for converting the write data to the recording code. The data decoder is constituted, for example, of a signal processing circuit of a partial response maximum likelihood (PRML) type, and decodes the data from the read signal (digital signal) equalized into a predetermined PR waveform by the equalizer 16.

The data encoder executes recording code processing, for example, of a run length limited (RLL) method. The servo decoder 19 extracts and decodes servo data recorded beforehand in a servo sector on the disk 1 from the read signal read by the read head as described later. Furthermore, the register 23 holds data for control (initial gain data for gain control in the present embodiment) given from the CPU 6 via the HDC 8.

The HDC 8 constitutes an interface of a drive and host system (personal computer, digital apparatus), and executes transfer control and the like of read/write data. The CPU 6 is a drive main controller, and is a main element of a servo system which executes positioning control (servo control) of the head 3. The CPU 6 controls seek operations and track following operations in accordance with the servo data reproduced by the read/write channel 10. Concretely, the CPU 6 controls an input value (control voltage value) of a VCM driver 9A, and thereby drives/controls the VCM 5 of the actuator. Moreover, in the present embodiment, the CPU 6 executes processing of setting the initial value (data CI) for gain control of the AGC amplifier 13 during the read operation as described later. The memory 7 includes a RAM, ROM, and flash EEPROM, and stores various control data including a control program of the CPU 6 and an AGC table 30 according to the present embodiment. The motor driver 9 includes not only the VCM driver 9A but also an SPM driver 9B for driving the spindle motor (SPM) 2.

(Constitution of Disk 1)

The disk 1 is rotated at high speed by the spindle motor 2 during the read/write operation on the data. The disk 1 includes a servo sector 100 as a region in which servo data for use in a head positioning control (servo control) is recorded by an exclusive-use apparatus called a servo track writer during manufacturing as shown in FIG. 1. A plurality of servo sectors 100 are arranged at predetermined intervals in a peripheral direction. A large number of tracks 101 including the servo sectors 100 are constituted in a concentric form in the disk 1. A plurality of data sectors 102 are disposed in regions other than the servo sectors 100 in the respective tracks 101. The data sectors 102 are recording areas of user data.

The servo data recorded in the servo sectors 100, and the user data recorded in the data sectors 102 (hereinafter sometimes referred to simply as the data) are different from each other in signal frequency, and a servo signal frequency is generally about 1/10of a data signal frequency. Moreover, the servo data signals are recorded in the inner/outer peripheral tracks at the same frequency. On the other hand, the data is recorded by a ZBR method (ideally a CDR method) so that the linear recording density becomes as constant as possible in the inner/outer peripheral tracks.

In the ZBR method, for example, when the number of data tracks is 10000, these are divided into groups of ten zones. In this case, a simplest dividing method comprises: equally allocating continuous 1000 tracks into each zone. Moreover, in the ZBR method, the linear recording density of the data of an innermost peripheral track in each zone is designed to be substantially equal. Additionally, the recording frequency of the data is substantially the same in one zone, but the linear recording density differs in the respective tracks. The number of divided zones is increased, and thereby an ideal CDR method is realized such that the linear recording density becomes constant in all the tracks. However, in reality, it is not easy to increase the divided zone number, and the zone number is generally designed, for example, as about 10 to 20.

Here, in the read/write channel 10, recording frequencies of servo and data signals differ, data and servo sectors are independent of each other in time, and various parameters are therefore different with data demodulation and servo demodulation. Concretely, different values are used in a differentiation band of the differentiation circuit 12, cut-off frequency of LPF 14, sampling frequency of the A/D converter 15, design value of the equalizer 16, and the like in the data demodulation and servo demodulation.

(Constitution of AGC Amplifier)

The AGC amplifier 13 includes a variable gain amplifier (VGA) circuit 22 in which gain of the amplifier is variable in accordance with a gain control signal (voltage signal) GC, gain detector 20, and integration circuit 21. The gain detector 20 detects a difference between the amplitude of the read signal, and the predetermined signal amplitude. The integration circuit 21 integrates an error value GE output from the gain detector 20, and outputs the gain control signal GC as a feedback control signal to the VGA circuit 22. The gain detector 20 detects a gain error from an output of the A/D converter 15 in an initial time, and uses an output signal of the equalizer 16 after amplitude control is executed to some degree.

In the AGC amplifier 13, feedback control is performed so that the gain error finally turns to zero. In the AGC amplifier 13, at a time point when AGC operation (gain control) is started from the top of each data sector as a start position of the read operation, an initial gain value (initial value for the gain control) CI for generating the control signal GC of the initial time is set in the integration circuit 21. In the present embodiment, the CPU 6 refers to the AGC table 30 stored in the memory 7, reads the initial gain data (CI) corresponding to the zone as the read object, and sets the data into the register 23 of the read/write channel 10 via the HDC 8. The integration circuit 21 inputs the initial gain data (CI) from the register 23.

Here, in the memory (e.g., the flash EEPROM) 7, as shown in FIG. 3, the AGC table information 30 constituted of initial gain data groups (CI-0 . . . ) set for the respective zones and initial gain data (CI-S) corresponding to the servo sector is stored as an optimum value of a read operation time of the data.

Since the servo data signals recorded in the servo sectors 100 have the same signal frequency in the inner/outer peripheral tracks, and the signal amplitudes are substantially constant, only one initial gain value (CI-S) optimized for each disk drive is stored in the memory 7. On the other hand, the data signals in the data sectors 102 have different recording frequencies for the respective zones, and the signal amplitudes of the read signals read by the read head are different. Therefore, in the present embodiment, the initial gain data group (CI-0 . . . ) optimized for each disk drive and for each zone is stored in the memory 7.

Concretely, as shown in FIG. 2, the integration circuit 21 includes a digital integrator 210, adder 211, and D/A (digital-to-analog) converter 212. The digital integrator 210 integrates an error value (digital value) GE output from the gain detector 20. The adder 211 adds an integrated value from the digital integrator 210, and the initial gain value (CI) set by the CPU 6. The D/A converter 212 converts a gain control value as an added value of the adder 211 to the analog control signal GC and outputs the signal to the VGA 22.

(Read Operation)

Figure 4:
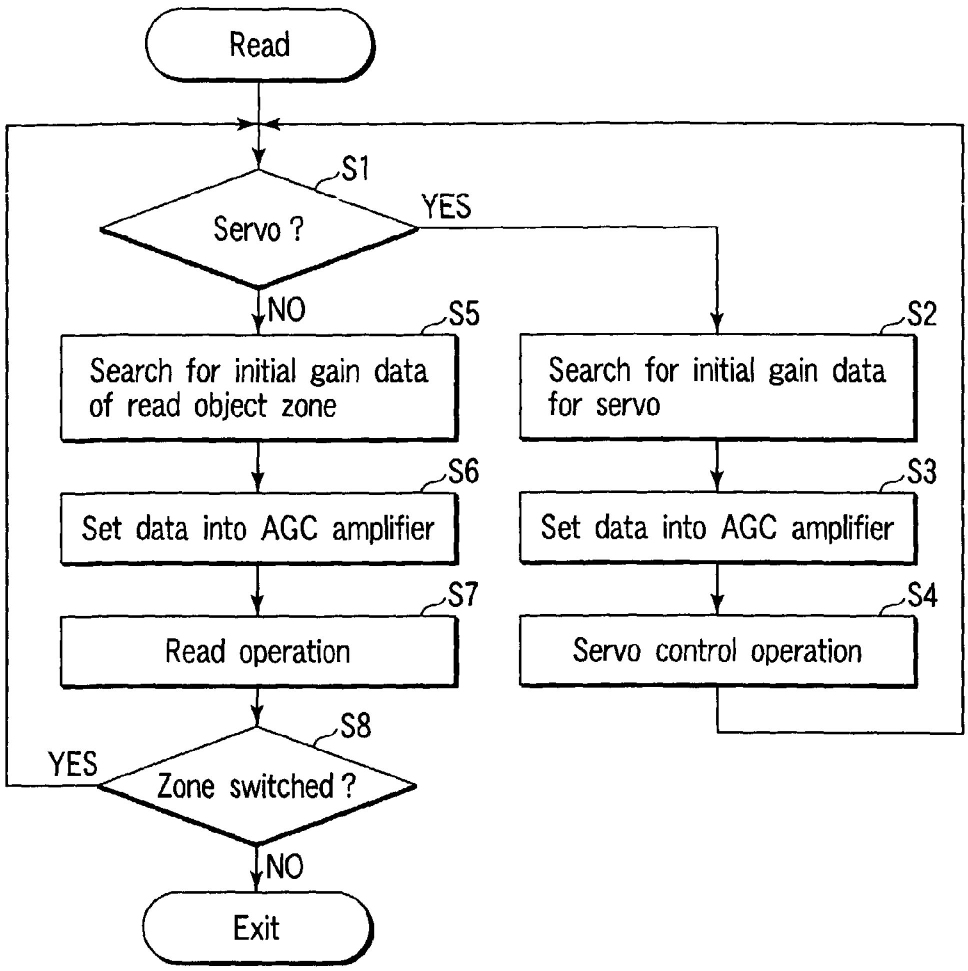
FIG. 4 is a flowchart showing a read operation according to the present embodiment.

A read operation of the present embodiment will be described hereinafter with reference to a flowchart of FIG. 4 in addition to FIGS. 1 and 3.

In the disk drive, during the read operation for reading the data from the disk 1, a target position of a read object (data access object) is determined, and a servo control operation is executed in which the head (read head) 3 is positioned in the target position (YES in step S1). Here, the target position is designated by a zone number set on the disk 1, track address in the zone, and data sector number included in the track.

During the servo control operation, the CPU 6 reads the initial gain data for servo (CI-S) from the AGC table 30 of the memory 7, and sets the data into the register 23 of the read/write channel 10 (step S2). In the read/write channel 10, the initial gain data (CI-S) is set into the integration circuit 21 included in the AGC amplifier 13 from the register 23 (step S3).

The CPU 6 executes the servo control operation to drive/control the actuator via the VCM 5, to move the head 3 to the target position on the disk 1 (seek operation), and to position the head in the target track in the zone (track following operation) (step S4). In the servo control operation, the AGC amplifier 13 executes an amplitude adjustment of the servo data signal read from the servo sector 100 by the read head in the read/write channel 10. In this case, the integration circuit 21 of the AGC amplifier 13 uses the initial gain data (CI-S) as the optimum data for servo, and controls the gain of the VGA circuit 22 to be optimum.

On the other hand, the servo control operation is completed, and the read head shifts to a state in which the head is maintained in the target position. Then, the CPU 6 starts the read operation to read the data from a designated data sector as the target position (NO in the step S1). In this case, the CPU 6 reads the initial gain data (CI-0 . . . ) corresponding to the zone of the target position from the AGC table information 30 of the memory 7, and sets the data into the register 23 of the read/write channel 10 (step S5). In the read/write channel 10, the initial value gain data (CI-0 . . . ) from the register 23 is set into the integration circuit 21 included in the AGC amplifier 13 (step S6).

In the read operation, in the read/write channel 10, the AGC amplifier 13 executes the amplitude adjustment of the data signal read from the first data sector 102 by the read head (step S7). In this case, the integration circuit 21 of the AGC amplifier 13 uses the initial gain data CI (e.g., CI-0) optimum for data in the target zone, and controls the gain of the VGA circuit 22 to be optimum. Here, in reality, in the read operation of the first data sector during zone switching, the CPU 6 switches the initial gain data (CI) of the AGC amplifier 13 (step S8). That is, in the read operation from the next data sector included in the target zone, the control signal GC used in the previous data sector is used.

As described above, according to the present embodiment, in the read operation, the initial gain value (CI) necessary for the AGC operation of the AGC amplifier 13 of the read/write channel 10 is switched for each zone as the read object. Therefore, even when the recording frequency differs with each zone, and the signal amplitude of the read signal read by the read head differs, the AGC operation is executed with the gain controlled by the optimum initial gain value (CI).

For example, when the zone of the read object is an outer peripheral zone, the amplitude of the data signal differentiated by the differentiation circuit 12 becomes relatively large, and therefore the initial gain value (CI) having a relatively small value is set. Conversely, when the zone of the read object is an inner peripheral zone, the amplitude of the data signal differentiated by the differentiation circuit 12 becomes relatively small, and therefore the initial gain value (CI) having a relatively small value is set.

In short, since the optimum initial value CI is set for each zone (during the switching of the zone) in the AGC operation of the AGC amplifier 13 necessary for the read operation, an adequate AGC acquisition time (gain control time) in the AGC operation can be realized. Thereby, since the data decoding by the data decoder is possible with respect to the read signal having a constantly adequate signal amplitude in the read/write channel 10, accurate data is reproduced. Particularly, the present embodiment is remarkably effective in the disk drive of the perpendicular magnetic recording method in which the differentiation circuit 12 is used.

Additionally, in the present embodiment, the method of switching the initial value CI for each zone has been described in which the ZBR method is assumed from a practical viewpoint. However, the present invention can also naturally be applied to the switching of the initial value CI for each track in which an ideal CDR method is assumed.

(Characteristic of Perpendicular Magnetic Recording Method)

The present embodiment is applied to a disk drive of the perpendicular magnetic recording method.

Figure 6A:
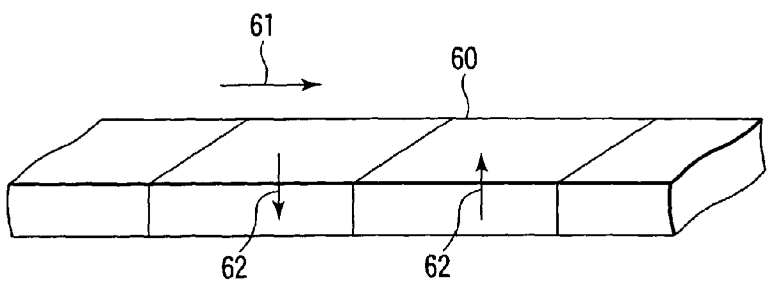
FIG. 6A is a diagram showing the magnetized state of the recording data in a perpendicular magnetic recording method.
Figure 6B:
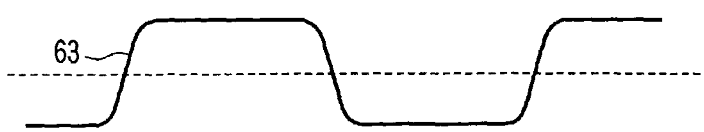
FIG. 6B is a diagram showing the read signal waveform in the method.

In general, for the perpendicular magnetic recording method, when data (0/1) is recorded in a data track 60 as shown in FIG. 6A, a magnetization region corresponding to the data is formed in a perpendicular direction (depth direction 62) of the disk (rotative direction 61). In the perpendicular magnetic recording method, as shown in FIG. 6B, the amplitude shifts in a magnetization transition region, and a read signal having a substantially rectangular wave whose amplitude corresponds to the direction of magnetization is read by the head.

Figure 6C:
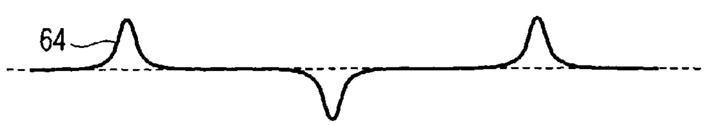
FIG. 6C is a diagram showing a differentiated signal waveform in the method.

Here, when the read signal obtained in the perpendicular magnetic recording method is differentiated, or the differentiation is executed in at least a band with signal components present therein, as shown in FIG. 6C, the read signal (differentiated waveform) is obtained similarly as in the longitudinal magnetic recording method. That is, the amplitude is maximized in the magnetization transition region, and a signal having a different amplitude polarity is obtained in accordance with the transition to a negative-direction magnetization from a positive-direction magnetization, or to the positive-direction magnetization from the negative-direction magnetization.

Figure 7A:
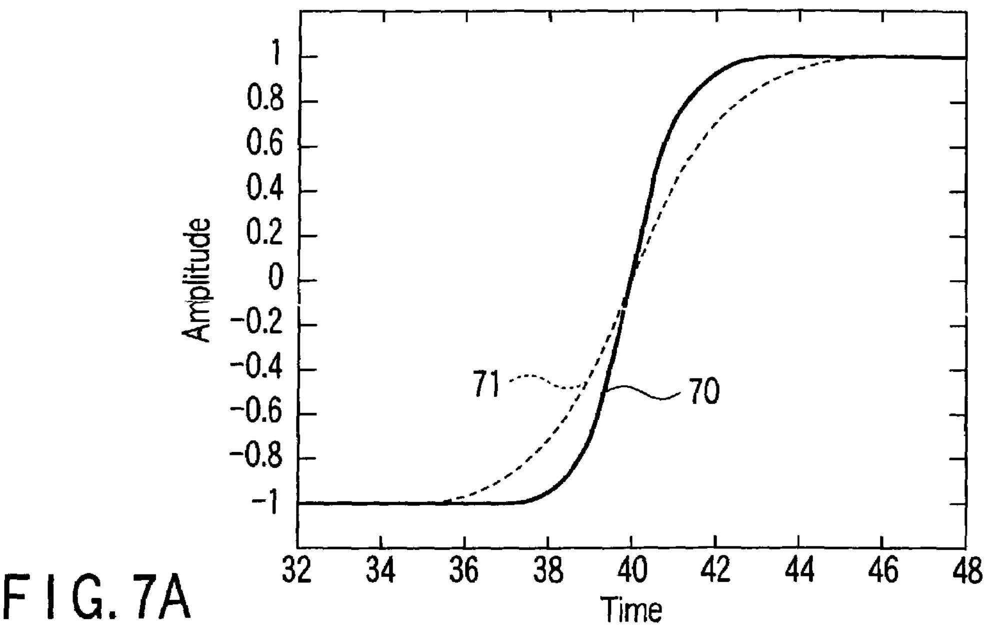
FIGS. 7A and 7B are diagrams showing one example of an isolated read signal waveform from innermost and outermost peripheral tracks in the method.

FIG. 7A shows a read signal waveform with respect to isolated magnetization transition in a case in which the data recorded onto the disk by the perpendicular magnetic recording method is read by the read head. Here, the read head is an MR head. A read signal waveform 70 is a read signal waveform from the outermost peripheral track on the disk. Moreover, a read signal waveform 71 is a read signal waveform from the innermost peripheral track on the disk. The maximum amplitudes of these read signals with respect to the isolated magnetization transition are constant without depending on the position in the radial direction of the track (i.e., the linear speed), because the read head is the MR head. On the other hand, the transition time width of the isolated magnetization transition changes in proportion to the linear speed. Therefore, the transition time width of the isolated magnetization transition in the outermost peripheral track is narrowed by ½with respect to the transition time width in the innermost peripheral track having a relatively ½linear speed. In other words, the transition time width in the outermost peripheral track has a relatively double steep inclination.

Figure 7B:
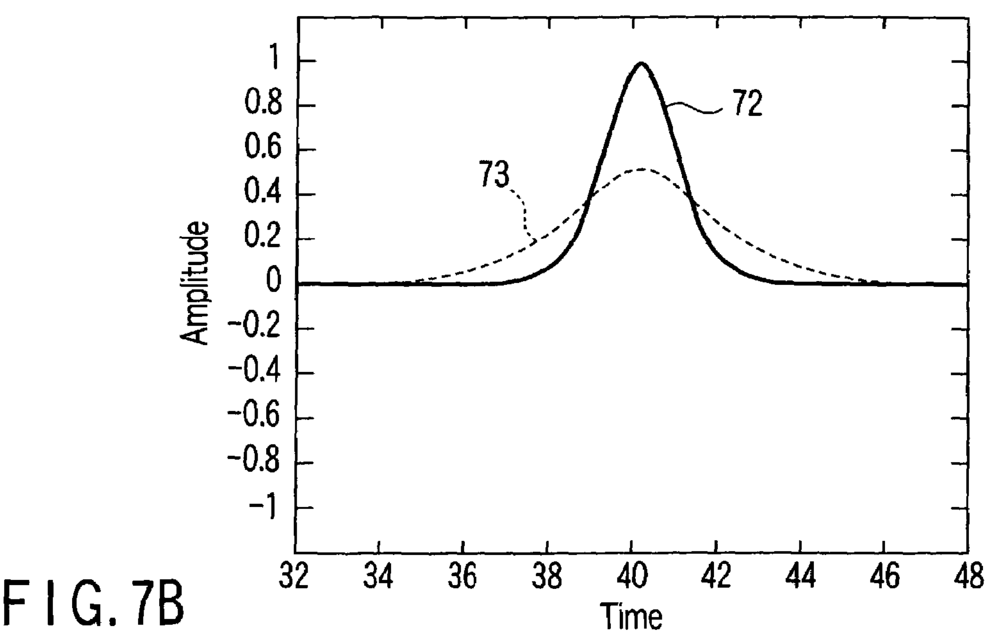

FIG. 7B shows read signal waveforms 72, 73 obtained by subjecting the read signal waveforms 70, 71 shown in FIG. 7A to a differentiation processing by the differentiation circuit. The disk drive of the perpendicular magnetic recording method has a differentiation circuit for differentiating the read signal as described above. The amplitude of the differentiated signal obtained by differentiating the read signal obtained from the isolated magnetization transition depends on the transition time width of the signal before the differentiation. When the inclination of transition becomes steep, the amplitude increases. As shown in FIG. 7B, the outermost peripheral track having a half transition time width (double transition inclination) in the signal before the differentiation has a differentiated signal amplitude which is twice the differentiated signal amplitude of the innermost peripheral track.

Figure 8A:
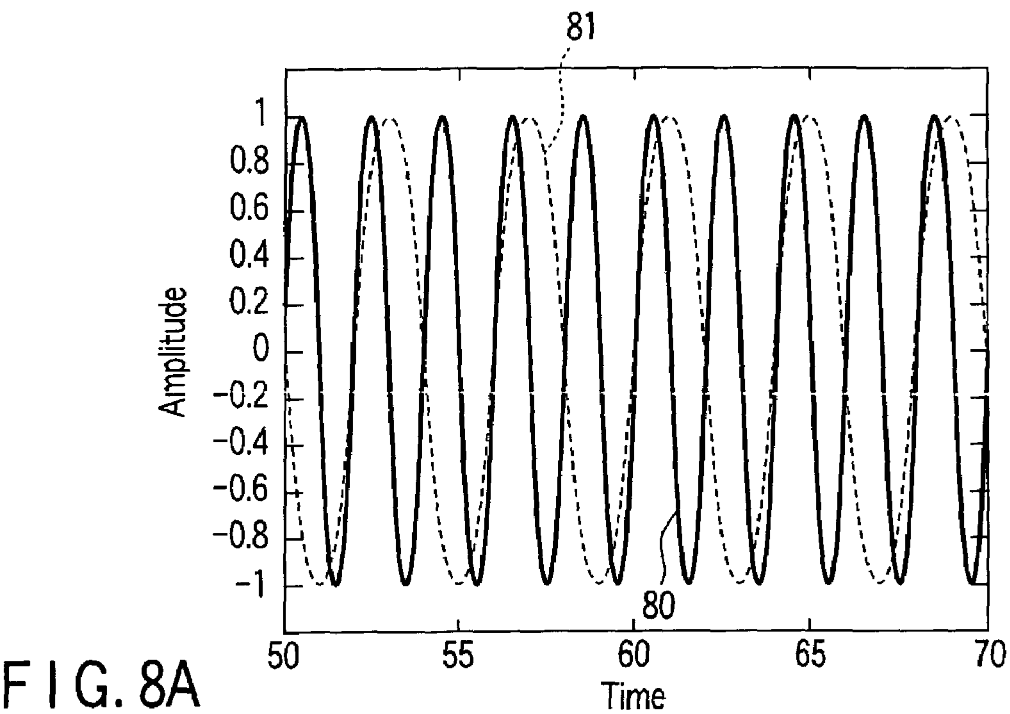
FIGS. 8A and 8B are diagrams showing one example of the read signal waveform from the innermost and outermost peripheral tracks in the method.
Figure 8B:
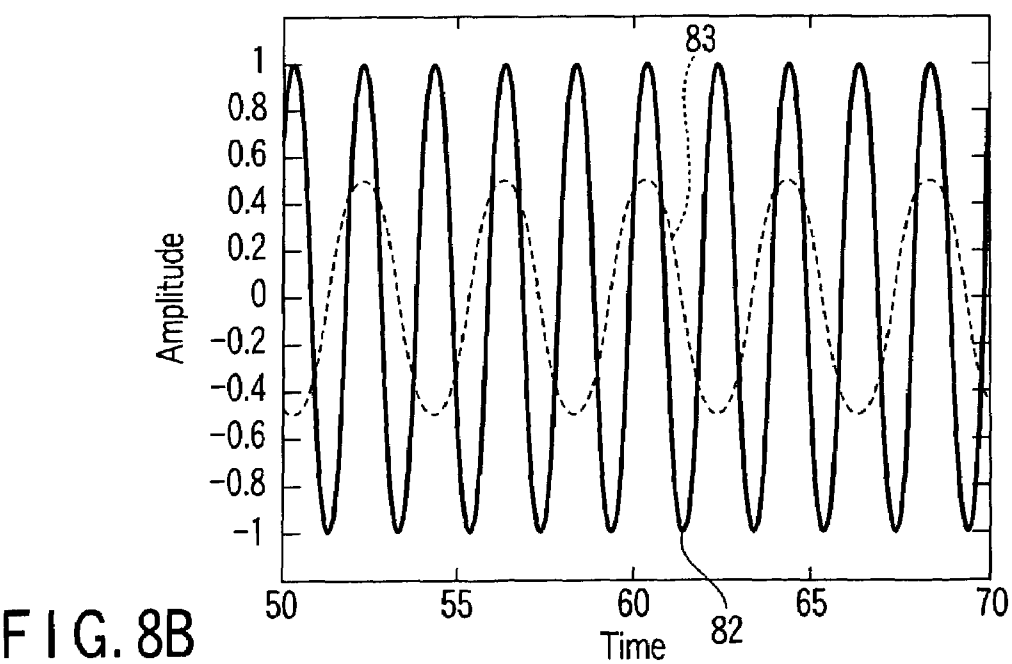

Moreover, FIG. 8A shows a read signal waveform 80 obtained from the outermost peripheral track and a read signal waveform 81 obtained from the innermost peripheral track in a case in which the data is repeatedly recorded on the disk with the same linear recording density by the perpendicular magnetic recording method. FIG. 8B shows differentiated signal waveforms 82 (signal corresponding to 80), 83 (signal corresponding to 81) obtained by subjecting the read signal waveforms to the differentiation processing.

As shown in FIG. 8A, since the linear recording density is the same, the frequency of the repeated data recorded in the outermost peripheral track becomes twice the frequency in the innermost peripheral track. On the other hand, the transition time width in the outermost peripheral track is a half of the width of the innermost peripheral track. Therefore, the amplitude of the read signal obtained from the data recorded at the same linear recording density eventually becomes substantially constant regardless of the track position. However, the signal amplitudes obtained by differentiating these read signals are proportional to the frequency. Therefore, as shown in FIG. 8B, the signal amplitude of the read signal (differentiated signal) in the outermost peripheral track is twice the signal amplitude in the innermost peripheral track.

Figure 5A:
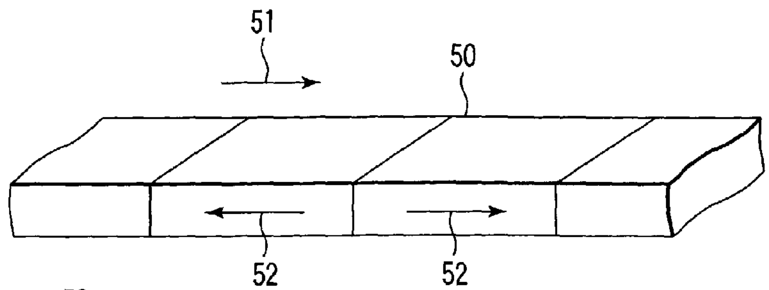
FIG. 5A is a diagram showing a magnetized state of recording data in a longitudinal magnetic recording method.
Figure 5B:
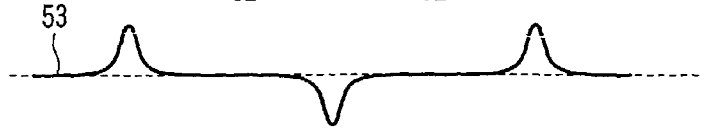
FIG. 5B is a diagram showing a read signal waveform in the method.

Additionally, FIG. 5A shows that the data (0/1) is recorded in a data track 50 in the longitudinal magnetic recording method. That is, the magnetization region (arrows 52) corresponding to the data is formed in a longitudinal direction (corresponding to a rotative direction 51) of a disk recording medium (hereinafter referred to simply as the disk). When the data is read from the disk by a magnetic head (referred to simply as the head), a read signal waveform 53 is obtained as shown in FIG. 5B. That is, the amplitude is maximized in the region (magnetization transition region) in which the direction of magnetization shifts, and the read signal waveform has a different amplitude polarity in accordance with the transitions to the negative-direction magnetization from the positive-direction magnetization and to the positive-direction magnetization from the negative-direction magnetization.

As described above, in short, according to the present embodiment, gain control of the AGC amplifier can appropriately be executed by a method of switching the initial gain value necessary for the gain control for each track or each zone on the disk. In other words, during the read operation for reading the data from the disk to decode the data, the optimum initial gain value can be set into the AGC amplifier, for example, for each zone. Therefore, the AGC amplifier operates for the constantly stable AGC acquisition time (gain control time), and the amplitude of the read signal is adjusted to be a predetermined amplitude value. Thereby, even when the amplitude of the read signal read for each zone changes, data decode processing can securely be executed from the read signal.

Therefore, the data can securely be decoded from the read signal read from any track or zone on the disk. Particularly, the present invention is effective for the disk drive of the perpendicular magnetic recording method in which the amplitude of the read signal changes in proportion to the recording frequency and the differentiation circuit for differentiating the read signal is disposed.

What is claimed is:

1. A disk drive comprising:

a disk medium in which a plurality of data areas with data recorded therein are constituted in a radial direction, the data areas being recording areas corresponding to a plurality of zones into which a track group constituted in the radial direction on the disk medium is formed;

a read head configured to execute a read operation of the data with respect to the respective data areas;

an AGC amplifier configured to control an amplitude of a read signal generated by the read operation by the read head;

a memory that stores a plurality of initial gain value data to set a gain of the AGC amplifier so as to be adapted for recording frequency characteristics for each of the respective zones, the initial gain value data being data that controls the gain of the AGC amplifier during an initial time of the read operation for each respective zone; and a controller configured to read the initial gain value data corresponding to the respective zones as read objects from the memory and to set the initial gain value data of the AGC amplifier at a start of gain control of the AGC amplifier during the initial time of the read operation by the read head, wherein the gain of the AGC amplifier can be varied after the initial gain value data is set in the AGC amplifier during the initial time of the read operation.

2. The disk drive according to claim 1, further comprising:

a write head configured to write the data into the data areas.

3. The disk drive according to claim 1, wherein the AGC amplifier comprises:

a VGA amplifier having a variable gain function; and an automatic gain controller which inputs the initial gain value data set from the controller, and uses the initial gain value data to output a gain control signal for controlling a gain of the VGA amplifier.

4. The disk drive according to claim 1, wherein a servo sector with servo data recorded therein and a data sector with user data recorded therein are disposed in each track on the disk medium, wherein a table constituted of initial gain value data for servo corresponding to the servo sector and a plurality of initial gain value data set for the respective zones in accordance with recording frequency characteristics of the user data is stored in the memory, and wherein the controller reads the initial gain value data for servo from the memory during a servo control operation of reading the servo data from the servo sector, reads the initial gain value data corresponding to a zone as a read object from the memory in the initial time of the read operation of reading the user data, and sets the data into the AGC amplifier.

5. The disk drive according to claim 1, further comprising:

a read channel which includes a differentiation circuit to differentiate a read signal read from the read head, and the AGC amplifier to adjust an amplitude of an output signal of the differentiation circuit, and which reproduces the data from the read signal, wherein the disk medium is configured to record data by a perpendicular magnetic recording method.

6. The disk drive according to claim 1, wherein the controller reads the corresponding initial gain value data from the memory, and sets the initial gain value data into the AGC amplifier at a start of gain control of the AGC amplifier in a switching time of a zone as a read object.

7. A method of reading data from a disk medium by a read head in a disk drive, the disk drive including the disk medium in which a plurality of data areas with the data recorded therein are constituted in a radial direction, an AGC amplifier which controls an amplitude of a read signal that is read during a read operation by the read head, and a memory that stores a plurality of initial gain value data to control a gain of the AGC amplifier for the respective data areas in accordance with recording frequency characteristics of the respective data areas, the method comprising:

reading the initial gain value data corresponding to the data areas as read objects from the memory at a start of gain control of the AGC amplifier during an initial time of the read operation by the read head for each respective data area;

setting the initial gain value data read from the memory into the AGC amplifier; and reproducing the data from the read signal whose amplitude is controlled by the AGC amplifier, wherein the gain of the AGC amplifier can be varied after the initial gain value data is set in the AGC amplifier in the initial time of the read operation.

8. A disk drive comprising:

a read head configured to perform a read operation to read data from data areas on a disk medium and generate a read signal, the data areas corresponding to a plurality of zones radially disposed on the disk medium;

an AGC amplifier configured to control an amplitude of the read signal based on an initial gain value;

a memory configured to store a plurality of initial gain values to set an initial gain of the AGC amplifier for each of the plurality of zones based on the reading of frequency characteristics of each of the plurality of zones at the beginning of the read operation for each of the plurality of zones;

a controller configured to access the plurality of initial gain values from the memory and to set the initial gain of the AGC amplifier at the beginning of the read operation; and an integration circuit to control a gain of the AGC amplifier after the initial gain is set at the beginning of the read operation.

9. The disk drive according to claim 8, wherein the AGC amplifier includes the integration circuit, and wherein the gain is varied after the initial gain is set to adjust the gain to a predetermined optimum value.

* * * * *